US011533279B2

(12) United States Patent
Hansmann et al.

(10) Patent No.: US 11,533,279 B2
(45) Date of Patent: Dec. 20, 2022

(54) METHOD FOR ELECTRONIC MESSAGING USING IMAGE BASED NOISY CONTENT

(71) Applicant: INTERNATIONAL BUSINESS MACHINES CORPORATION, Armonk, NY (US)

(72) Inventors: Uwe Karl Hansmann, Tuebingen (DE); Vijay Ekambaram, Chennai (IN); Smitkumar Narotambhai Marvaniya, Bangalore (IN); Timo Kussmaul, Boeblingen (DE); Thomas Stober, Herrenberg (DE); Sneha Mondal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/301,244

(22) Filed: Mar. 30, 2021

(65) Prior Publication Data
US 2022/0321508 A1      Oct. 6, 2022

(51) Int. Cl.
*H04L 51/043* (2022.01)
*G06F 21/84* (2013.01)
*H04L 51/02* (2022.01)
*G06N 5/02* (2006.01)
*G06N 3/04* (2006.01)
*H04L 51/212* (2022.01)

(52) U.S. Cl.
CPC ............ *H04L 51/043* (2013.01); *G06F 21/84* (2013.01); *G06N 3/04* (2013.01); *G06N 5/02* (2013.01); *H04L 51/02* (2013.01); *H04L 51/212* (2022.05)

(58) Field of Classification Search
CPC ....... H04L 51/043; H04L 51/02; H04L 51/12; G06F 21/84; G06N 3/04; G06N 5/02
See application file for complete search history.

(56) References Cited

U.S. PATENT DOCUMENTS

| 7,783,486 B2 | 8/2010 | Rosser |
|---|---|---|
| 8,818,926 B2 | 8/2014 | Wallace |

(Continued)

FOREIGN PATENT DOCUMENTS

| CN | 109033223 A | 12/2018 |
|---|---|---|
| CN | 110110062 A | 8/2019 |

(Continued)

OTHER PUBLICATIONS

Ashktorab, et al., "Resilient Chatbots: Repair Strategy Preferences for Conversational Breakdowns", CHI 2019 [paper], May 4-9, 2019, 12 pages, Glasgow, SCT, UK.

(Continued)

*Primary Examiner* — Nicholas R Taylor
*Assistant Examiner* — Tania M Pena-Santana
(74) *Attorney, Agent, or Firm* — Jordan T. Schiller (57) ABSTRACT

The present disclosure relates to a method comprising receiving an electronic message of an electronic communication system. An image based noisy content may be generated. The image based noisy content is different from a content of the received electronic message and relates to the message intents of the received message. The electronic communication system may be configured to provide the image based noisy to the recipient instead of the received electronic message or provide the received electronic message to the recipient in addition to the image based noisy.

18 Claims, 6 Drawing Sheets

(56) References Cited

U.S. PATENT DOCUMENTS

| | | | |
|---|---|---|---|
| 9,369,410 | B2 | 6/2016 | Capper |
| 10,026,400 | B2 | 7/2018 | Gelfenbeyn |
| 10,170,106 | B2 | 1/2019 | Gelfenbeyn |
| 10,482,184 | B2 | 11/2019 | Gelfenbeyn |
| 10,546,067 | B2 | 1/2020 | Gelfenbeyn |
| 10,553,214 | B2 | 2/2020 | Aleksic |
| 2011/0125734 | A1 | 5/2011 | Duboue |
| 2015/0172242 | A1* | 6/2015 | Goncalves ............ H04L 51/212 709/206 |
| 2017/0178529 | A1 | 6/2017 | Chetlur |
| 2017/0259177 | A1 | 9/2017 | Aghdaie |
| 2017/0357896 | A1* | 12/2017 | Tsatsin ................... G06N 3/084 |
| 2018/0181592 | A1* | 6/2018 | Chen ................... G06F 16/5866 |
| 2018/0204314 | A1* | 7/2018 | Kaplanyan ............ G06V 10/82 |
| 2019/0109802 | A1 | 4/2019 | Akkiraju |
| 2019/0230058 | A1 | 7/2019 | Turfan |
| 2019/0251859 | A1 | 8/2019 | Xu |
| 2020/0098366 | A1 | 3/2020 | Chakraborty |
| 2020/0111377 | A1 | 4/2020 | Truong |
| 2020/0202194 | A1 | 6/2020 | Wu |
| 2020/0226288 | A1* | 7/2020 | Zhang ................... G06F 40/295 |
| 2020/0320116 | A1 | 10/2020 | Wu |
| 2020/0327327 | A1 | 10/2020 | Wu |
| 2020/0358732 | A1 | 11/2020 | Raviv |
| 2020/0387804 | A1* | 12/2020 | Mathur .................. G06N 5/046 |
| 2020/0410335 | A1* | 12/2020 | Gu ........................ G06K 9/6256 |
| 2021/0058355 | A1 | 2/2021 | Dawes |
| 2021/0089903 | A1* | 3/2021 | Murray ................ G06N 3/0454 |

FOREIGN PATENT DOCUMENTS

| | | |
|---|---|---|
| CN | 110602311 A | 12/2019 |
| CN | 112241468 A | 1/2021 |

OTHER PUBLICATIONS

Devlin, et al., "Bert: Pre-training of Deep Bidirectional Transformers for Language Understanding", Google AI Language, May 24, 2019, 16 pages, arXiv:1810.04805v2.

Disclosed Anonymously, "Chatbot Development: Building Bots with Wit.ai," Discover.bot, Jul. 16, 2019 [accessed on Aug. 3, 2020], 6 pages, Retrieved from the Internet: <URL: https://discover.bot/bot-talk/guide-to-bot-buiding-frameworks/wit-ai/>.

Google Cloud, "Dialogflow basics," Dialogflow Documentation, [Retrieved on Mar. 23, 2021], 10 pages, Retrieved from the Internet: <URL: file:///C:/Users/ERIKAF~1/AppData/Local/Temp/NPL%20-%20Dialogflow%20basics%20Dialogflow%20Documentation%20Google%20Cloud.htm>.

Weston, et al., "Towards AI-Complete Question Answering: A Set of Prerequisite Toy Tasks", Facebook AI Research, Dec. 31, 2015, 14 pages, arXiv:1502.05698v10.

IBM: List of IBM Patents or Patent Applications Treated as Related (Appendix P), Mar. 30, 2021, 2 pages.

Pending U.S. Appl. No. 17/216,956, entitled "Method for Electronic Messaging", filed Mar. 30, 2021, 48 Pages.

International Searching Authority, "Notification of Transmittal of the International Search Report and the Written Opinion of the International Searching Authority, or Declaration," Patent Cooperation Treaty, dated May 26, 2022, 10 pages, International Application No. PCT/CN2022/079742.

Hansmann, et al., "Method for Electronic Messaging Using Image Based Noisy Content," Application and Drawings, Filed on Mar. 8, 2022, 45 Pages, Related PCT Patent Application Serial No. PCT/CN2022/079742.

Hansmann, et al., "Method for Electronic Messaging," Application and Drawings, Filed on Mar. 8, 2022, 46 Pages, Related PCT Patent Application Serial No. PCT/CN2022/079755.

International Searching Authority, "Notification of Transmittal of the International Search Report and the Written Opinion of the International Searching Authority, or Declaration," Patent Cooperation Treaty, dated May 26, 2022, 10 pages, International Application No. PCT/CN2022/079755.

* cited by examiner

METHOD FOR ELECTRONIC MESSAGING USING IMAGE BASED NOISY CONTENT

BACKGROUND

The present invention relates to the field of digital computer systems, and more specifically, to an electronic messaging method.

An automatic training or testing of users or systems is today done with a pre-defined set of questions and answers. However, in the real world, information is not always provided in a simple and structured way. But contains a lot of ambiguity, noise or may only contain a subset of the needed information or even too much.

SUMMARY

Various embodiments provide a method, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for electronic messaging comprising:

receiving an electronic message of an electronic communication system, the message being determined for a recipient;

determining message intents of the received electronic message;

generating an image based noisy content, the image based noisy content being different from a content of the received electronic message and relating to the message intents;

controlling the electronic communication system to provide the image based noisy content to the recipient instead of the received electronic message or provide the received electronic message to the recipient in addition to the image based noisy content.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system configured for:
receiving an electronic message;
determining message intents of the received electronic message;
generating an image based noisy content, the image based noisy content being different from a content of the received electronic message and that relates to the message intents;
controlling the electronic communication system to provide the image based noisy content instead of the received electronic message or provide the generated electronic message in addition to the image based noisy content.

BRIEF DESCRIPTION OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Messaging may be a written communication sent over a variety of digital channels such as email, SMS and in-app chat. The messaging may be advantageous as it may provide relevant information at the right time. In particular, a messaging that is performed with the right information and frequency may increase the performance of the electronic communication system. Electronic messages may however be challenging to manage due to the proliferation of platforms, devices, and systems used to create these records. The present subject matter may be advantageous as it may provide a systematic way for controlling and managing the communication of electronic messages. This may particularly be advantageous, as in some agencies, the use of text and chat/instant messages may be critical to accomplishing the agency mission.

The electronic message may be received by, for example, reading a log of conversations in order to generate messages for a messaging session. In another example, the electronic message may be received by intercepting it e.g., during an ongoing messaging session. The intercepted electronic message may, for example, be provided during a messaging session. The messaging session may involve the exchange of electronic messages including text, multimedia, and/or voice in a real-time format or a non real-time format. The real time format may involve instant messaging or chat and the non-real time format may involve email, posting to a dynamic forum or feed, etc. The messaging session may be associated with a context depending on use cases. For example, a messaging session may be performed between a chatbot agent and a user for training or testing the user by the chatbot agent. In this case, the electronic messages may be questions and answers. In another example, a messaging session may be performed between a plurality of users via a mobile messaging application provided on respective mobile client devices of the plurality of users. In another example, the messaging session can include a group chat via which the respective users share and discuss various topics including videos or other types of multimedia. The term "chatbot" or "chat bot" or "chat agent" is a computer program designed to simulate a conversation with one or more human users via auditory or textual methods, primarily for engaging in small talk or for training. An aim of such simulation may be to fool the end-user into thinking that the program's output has been produced by a human.

The intercepted/received electronic message is processed in order to generate an image based noisy content. The image based noisy content may be a content. That content is named image based noisy content because it involves images and has intents which are only related to the message intents. For example, that content may contain one or more images and/or be generated using one or more images. The image based noisy content may be generated such that its intents are a subset of the message intents, wherein this subset is obtained by excluding important intents from the message intents or obtained by selecting unimportant intents from the message intents. The message intents may be ranked based on their importance. The message intents may, for example, be ranked based on centrality indices of a knowledge graph such that the subset comprises K less important message intents, where K≥1. The message intents may, in another example, be ranked based on user inputs e.g., a user may be prompted to provide a ranking of the message intents and the ranking may be received.

For example, the image based noisy content may comprise one or more images that can be used to enhance an existing communication flow e.g., of a training session between a chat agent and a user. In case of a training use case, the image based noisy content may be generated to increase the level of difficulty of predefined questions by providing incomplete information, adding confusing intents to add ambiguity, and/or adding misleading intents to the intercepted/received electronic message. In particular, the present subject matter may, for example, be employed to test/tutor trainees who will eventually provide after-sales support, customer service for products, or senior medical students to apply medical knowledge and solve virtual patient cases. In the latter case, the image based noisy content may be in the form of distracting medical diagnoses, faulty test results, patient images/photos, etc. Since the final interaction may be a conversation between two human agents (consumer-customer-service agent, doctor-patient), the chat agent may be a conversational chatbot that can mimic such human dialogues. In one example, the image based noisy content may comprise noisy multimodal conversational utterances based on the identified context from the conversational setting of the chatbot. The multimodal may refer to the introduction of inconsistency across both text and image.

In case of a communication system where sensitive information should not be provided according to data access rules, the intercepted/received electronic message may be processed to identify intents that do not fulfill the data access rules in order to be masked or removed. The generated image based noisy content may comprise the unmasked information of the received electronic message. This may enable a secure communication of data.

According to one embodiment, the method further comprises: determining a domain of the electronic message, determining a set of one or more text messages and a set of one or more images of the determined domain, wherein generating the image based noisy content comprises any one of:

generating one or more noisy images from the set of text messages, wherein the image based noisy content is the noisy images, extracting a noisy text from the set of images, wherein the image based noisy content is the noisy text, and generating a noisy multimodal content from the set of images and the set of text messages, wherein the image based noisy content is the noisy multimodal content.

The domain may represent concepts or categories which belong to a part of the world, such as biology or politics. The domain typically models domain-specific definitions of terms. For example, a domain can refer to healthcare, advertising, commerce, medical, chemical, physical, computer science, oil-and-gas or transportation. The domain of the electronic message may, for example, be determined using a natural language processing technique. The set of text messages and the set of images may, for example, be obtained from a history of textual and image conversational utterances. Obtaining more text and images of the same domain as the received electronic message may enable to better understand and process the differences between the message intents of the electronic message. The generation of images from the set of text messages may be performed using an embedding space as described with the following embodiment.

According to one embodiment, the generating of the image based noisy content comprises: determining a joint embedding space for representing electronic messages and images, representing a text message and a predefined set of images in the embedding space, ranking the set of images based on a similarity between the representations of the set of images and the representation of the text message in the embedding space, and selecting a subset of the set of images based on the ranking. The subset of images may be noisy images as they may have intents which are not similar to the intents of the text message, but still related to the message intents of the text message. The text message that is represented in the embedding space may be the received electronic message. In another example, the text message may be a message similar to the electronic message e.g., the text message has a number of intents which are equal to or smaller than the message intents of the electronic message. In another example, the text message may be one of the set of text messages of the previous embodiment. The set of images may, for example, be screenshots. The screenshots may, for example, be of a user interface taken at successive stages of development of a software or at stages of monitoring a device etc.

According to one embodiment, the subset of images are the second k-ranked images, wherein k is a value of a configurable parameter. For example, the set of images are 10 images and k=3, the subset of images may comprise the images ranked $7^{th}$, $6^{th}$ and $5^{th}$.

According to one embodiment, the method further comprises configuring the value of the parameter k in accordance with a desired noise level of the noisy content. The noise may, for example, be a user-based noise or issue-based noise. The user-based noise may, for example, be determined based on the user's property such as age etc. For example, the level of noise for an expert user may be provided higher than the level of noise for a normal user e.g., by increasing the value of the parameter k. The level of the issue-based noise may be changed by, for example, adding more confusing intents or removing more important intents. The level of noises may be controlled so that, for example, a generated multimodal noise is relevant to case-context. For example, too noisy data may confuse the trainee; however, irrelevant noise may not be useful to training. Thus, the noise may be introduced, according to this embodiment, such that the multimodal conversational utterance captures inconsistency between textual content and image content. Noise may also be introduced, according to this embodiment, such that the multimodal conversational utterance captures incomplete information in the form of image/text or both. E.g., a chatbot may introduce multimodal noise dynamically, depending on the auto generated text utterance and/or image utterance, and how trainee deals with previous noisy information. This may improve user engagement.

According to one embodiment, the joint embedding is learnt using hinge loss to align image and text in accordance with a Siamese neural network architecture. The Siamese neural network may produce embeddings such that distances represent semantic similarity of represented objects.

According to one embodiment, the generating of the image based noisy content comprises: determining, using a knowledge graph, related intents of the message intents, the knowledge graph comprising entities representing intents, and extracting, from a predefined set of images, a subset of images that are associated with the related intents and not associated with the message intents, wherein the image based noisy content is the subset of images.

The set of images may be represented by nodes in the knowledge graph. The knowledge graph may represent one or more domain ontologies. For example, the knowledge graph may represent the domain of software and/or hardware bug fixing. In this case, the nodes of the knowledge graph may, for example, represent intents, images and resolutions. The intent may, for example, represent a specific software problem e.g., the intent may be #heating or #virus indicating a problem due to computer heating and presence of a computing virus respectively. The resolutions are associated with the problems defined in the intents of the knowledge graph e.g., a resolution associated with the intent #virus may be #install_antivirus. The images may represent stack traces, error logs, function calls or command outputs. An image in the graph may, for example, be a screenshot of logs describing a problem related to one intent e.g., #fan_noise image may be associated with the intent #heating. The present subject matter may be advantageous as it may make use of a knowledge graph for accurately generating images.

However, the domain of the knowledge graph may be broad enough that it covers several topics. Following the example of the bug issues, several topics may be covered in the knowledge graph e.g., operating system issues may cover one topic, the display may cover another topic etc. This may be solved by clustering the knowledge graph. The knowledge graph may be clustered, resulting in multiple clusters. A cluster may, for example, be represented by a subgraph of the knowledge graph, wherein data of the cluster represents a specific topic. The cluster may comprise sub-clusters, wherein a sub-cluster may represent, commonly occurring intents, commonly co-occurring intents, commonly suggested resolutions, not-recommended or false resolutions etc. The related intents may, for example, be determined so that they belong to a same cluster.

The knowledge graph may be a graph. A graph may refer to a property graph where data values are stored as properties on nodes and edges. Property graphs may be managed and processed by a graph database management system or other database systems which provide a wrapper layer converting the property graph to, for example, relational tables for storage and convert relational tables back to property graphs when read or queried. The graph may, for example, be a directed graph. The graph may be a collection of nodes (also called as vertices) and edges. The edge of the graph connects any two nodes of the graph. The edge may be represented by an ordered pair (v1, v2) of nodes and that can be traversed from node v1 toward node v2. A node of the graph may represent an entity. The entity may refer to a problem, resolution etc. The entity (and the corresponding node) may have one or more entity attributes or properties which may be assigned values. For example, the entity attributes of the resolution may comprise an attribute indicating whether the resolution is commonly suggested resolution or a not-recommended resolution etc. The attribute values that represent the node are values of the entity attributes of the entity represented by the node. The edge may be assigned one or more edge attribute values indicative of at least a relationship between the two nodes connected to the edge. The attribute values that represent the edge are values of the edge attributes. The relationship may, for example, comprise an inheritance (e.g., parent and child) relationship and/or associative relationship in accordance with a certain hierarchy. For example, the inheritance relationship between nodes v1 and v2 may be referred to as a "is-a relationship" between v1 and v2 e.g., "v2 is-a parent of v1". The associative relationship between nodes v1 and v2 may be referred to as a "has-a relationship" between v1 and v2 e.g., "v2 has a has-a relationship with v1" means that v1 is part or is a composition of or associated with v2.

According to one embodiment, the method further comprises: determining using the electronic message a context of a messaging session, the context of the messaging session being defined by at least a subgraph of the knowledge graph, using the subgraph for determining the related intents as intents that belong to the determined context and are different from the message intents. The intents named "related intents" may be used to add ambiguity or insert confusing information. In other words, the content of the generated images may provide the incomplete information, ambiguity or confusing information.

The context of the messaging session may be the topic of the messaging session. The topic of the messaging session may be determined by analysing the content of the electronic message. The analysis may, for example, be performed using a data mining technique. The subgraph of the knowledge graph may comprise intents that may be supposed to share the topic of the electronic message. The intents of the subgraph may comprise the message intents of the intercepted electronic message. The subgraph may advantageously be used as it may enable a ranking of the intents of the subgraph based on their importance e.g., using the centrality.

According to one embodiment, the electronic message is intercepted from a chat application of the electronic communication system. The chat application is configured to simulate a conversation with a user during the messaging session. The method comprises: intercepting the electronic message of the chat application at specific points of time of the messaging session.

The chat application, e.g., a chat bot, may be used to conduct an on-line chat conversation via text or text-to-speech. For example, the chat application may be used for testing or training a user by asking questions to the user. The user may provide answers to the questions. The electronic message may, for example, comprise the text of a question. This embodiment may be advantageous as it may control the time at which the electronic messages, e.g., questions, need to be modified or adapted according to the present subject matter.

The points of time when to generate new/modified questions may, for example, be predefined or dynamically determined. For example, the points of time may dynamically be defined based on user inputs. This may, for example, enable to use different modes of operations of a conversation/training conducted with the user. For example, a simplified or difficult mode of training may be used. The simplified mode of training may only consider to modify a small portion of the questions (e.g., at the beginning of the conversation) while the difficult mode of operation may change a higher number of questions (e.g., at different stages of the conversation).

The images may be determined or generated by changing the intents of the intercepted electronic message. The change may be performed by removing intents of the intercepted electronic message in order to provide incomplete information, by adding confusing intents to add ambiguity, and/or by adding misleading intents to the intercepted electronic message.

According to one embodiment, the electronic communication system is a chat server that is configured to distribute messages between chat clients. For example, before distributing the electronic message, it is intercepted and processed according to the present subject matter.

According to one embodiment, the electronic message is received from a first chat client in destination to a second chat client, the method further comprising: detecting sensitive information in the received electronic message, wherein the noisy content of the determined images comprises unsensitive information, wherein the determined images are provided instead of the received electronic message. The sensitive information may, for example, comprise private information such as the full name etc.

According to one embodiment, the method further comprises: providing a knowledge graph representing a domain of computer related bugs fixing, the knowledge graph comprising entities representing problems and resolutions, wherein the message intents represent computer related technical problems and are associated with a set of resolutions in the knowledge graph, the determining of the images comprising determining using the knowledge graph, related intents of the message intents, the related intents being associated with resolutions different from said set of resolutions, and extracting, from a predefined set of images, a subset of images that are associated with the related intents and not associated with the message intents.

According to one embodiment, the method further comprises creating the knowledge graph using communication transcripts and/or logs of previous data communications, clustering intents of the knowledge graph according to one or more graph properties of the knowledge graph. The graph property comprises any one of: a centrality index of each node of the graph and a distance of each node to other nodes of the graph.

Figure 1A:
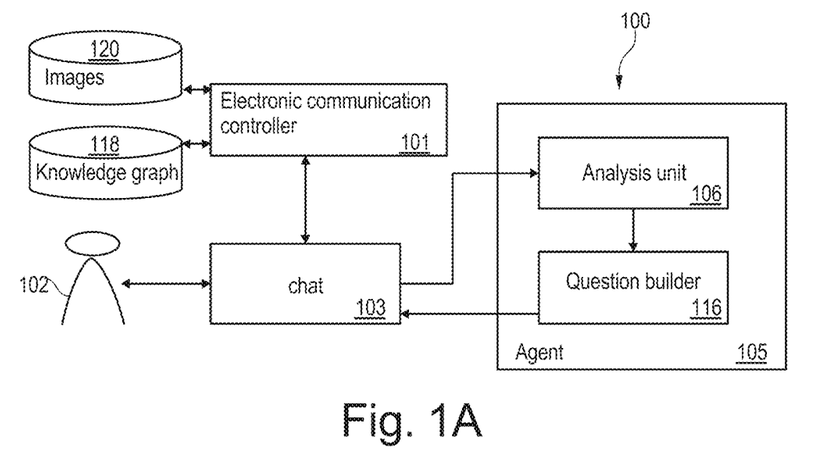
FIG. 1A illustrates a computer system in accordance with an example of the present subject matter.

FIG. 1A is a diagram of a computer system 100 in accordance with an example of the present subject matter. The computer system 100 comprises an agent computer 105. The agent computer 105 may be an electronic communication system. The computer system 100 comprises an electronic communication controller 101. The electronic communication controller 101 is connected to a chat link 103, to receive each successive message sent between a user 102 and the agent computer 105 during a conversation or chat session. The link 103 may connect the agent computer 105 to a remote user computer of the user 102 or may be a link to a display device of the agent computer 105. The link 103 may be set up over the Internet or other data channel. The link 103 may enable the conversation or chat to comprise a stream of text messages exchanged between user 102 and agent computer 105.

Successive messages of the user 102 are received at an analysis unit 106 of the agent computer 105. The analysis unit 106 performs the function of analysing a message, in order to determine the problem or inquiry of the user 102 which is the subject of the chat with the agent computer 105. If the message is in the form of text, the analysis unit 106 is provided with a text analytics capability, in order to carry out this function. The function of the analysis unit 106 may be part of a process for identifying a specific response that user 102 has provided in response to a question by the agent computer 105.

The agent computer 105 comprises a question builder 116 that receives inputs from the analysis unit 106. The question builder 116 uses these inputs (e.g., and a chatbot) to build or construct a request or question, wherein the request is a statement of a goal associated with a problem, and the user 102 needs to provide a solution to the problem. The question builder 116 may also generate a request without receiving any inputs from the analysis unit e.g., in order to initiate the conversation with the user 102. The message generated by the question builder 116 and/or the message received from the user 102 may be intercepted or provided as input to the electronic communication controller 101 via the link 103. The electronic communication controller 101 may use a knowledge graph 118 and/or a set of images 120 as a source of information for modifying the intercepted message according to the present subject matter.

Figure 1B:
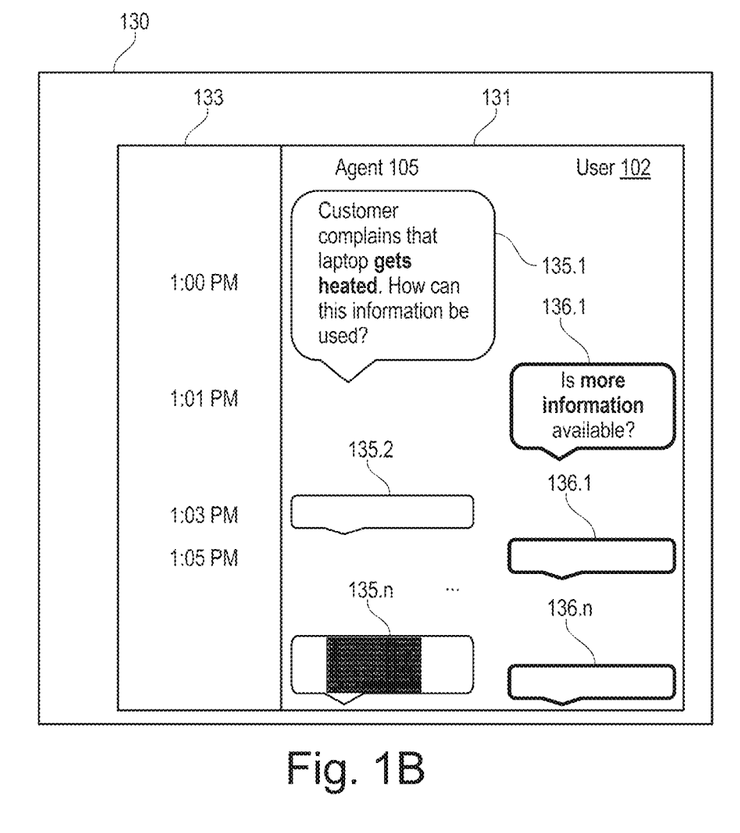
FIG. 1B depicts as window showing the transcript of a chat session.

The messages exchanged between the user 102 and the agent computer 105 may be displayed on a window 130 as shown in FIG. 1B. The window 130 may be displayed on a user interface of the agent computer 105 if the user 102 has a direct contact with the agent computer 105 or may be displayed on a remote user computer of the user 102.

FIG. 1B shows an example of a timeline view of chat messages between the user 102 and the agent computer 105. The window 130 showing the transcript of a chat session includes a first display region 131 for displaying the messages and a second display region 133 for displaying the timestamps of the chat messages. The messages are aligned with their respective timestamps. In the example shown in FIG. 1B, the agent computer 105 may provide messages 135.1 to 135.$n$, wherein each message may be a question to the user 102. In one example, the question may be supplemented by an image related to the item of the question. In another example, the question may be provided as an image. The user 102 may provide corresponding response messages 136.1 to 136.$n$.

Although shown as separate components, the electronic communication controller 101 may, in another example, be part of the agent computer 105.

Figure 2:
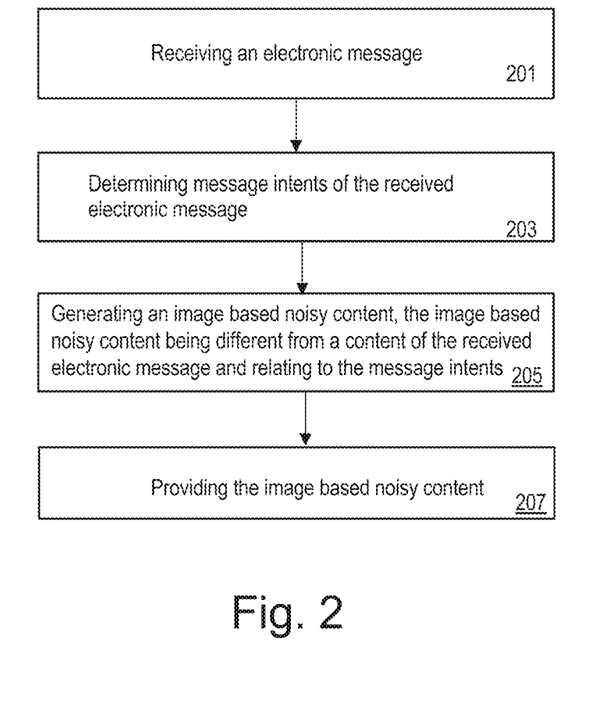
FIG. 2 is a flowchart of a method in accordance with an example of the present subject matter.

FIG. 2 is a flowchart of a method in accordance with an example of the present subject matter. For the purpose of explanation, the method described in FIG. 2 may be implemented in the system illustrated in FIG. 1A but is not limited to this implementation. The method of FIG. 2 may, for example, be performed by the electronic communication controller 101.

An electronic message may be received or identified in step 201, the electronic message being provided by the electronic communication system 105 e.g., to a user or recipient. The electronic message may be read from a log file of conversations or may be intercepted by the electronic communication controller 101. The electronic message may, for example, be a message that is transmitted from a sending computer to a receiving computer which is the electronic communication system 105. The electronic message may, for example, be an outgoing message from the electronic communication system 105. In this case, the electronic communication controller 101 may be configured to intercept the electronic message before being transmitted from the electronic communication system 105. In case the electronic message is an incoming message to the electronic communication system 105, the electronic communication controller 101 may be configured to intercept the received electronic message before being provided to a receiving application of the electronic communication system 101. In another example, the electronic message may be a message produced by an application of the electronic communication system 105 and displayed on an interface of the electronic communication system 105. In this case, the electronic communication controller 101 may be configured to intercept the electronic message before being displayed. The electronic communication controller 101 may or may not be part of the electronic communication system 105.

The electronic message may be any type of electronic communication data structures. The electronic message may, for example, be an electronic mail, instant message, audio message, or text message. The electronic message may be a message of a conversation. The electronic message may be one of chat messages of a conversation. The conversation may be a series of messages sent between a chat agent and one or more users. The electronic message may, for example, be the first chat message of the conversation or a randomly selected electronic message of the conversation. In another example, the electronic message may be a selected chat message of the conversation. The selection may be performed based on a selection criterion. The selection criterion may, for example, require that the message to be modified is received after a correct answer of the user.

Intents of the received or intercepted electronic message may be determined in step 203. The determined intents may be named message intents. The message intent may, for example, refer to the goal the chatbot agent has in mind when providing a question or comment. Intent classification may be the automated association of text to a specific purpose or goal. The message intents may, for example, be determined by a classifier. The classifier may analyse pieces of text and categorizes them into intents such as computing virus, heating etc. The intent classifier may, for example, use machine learning algorithms that can associate words or expressions with a particular intent.

In step 205, an image based noisy content may be generated. The image based noisy content comprises a noisy content that is different from a content of the received electronic message. Although different from the content of the received electronic message, the image based noisy content relates to the message intents. The image based noisy content may, for example, be one or more images. In another example, the image based noisy content may comprise text that is obtained from one or more images.

For example, the image based noisy content may be generated using a variational autoencoder (VAE). For that, a database of previously used text messages may be used to identify text messages that have the same domain as the received electronic message but have intents which are different from the message intents of the received electronic message. Those identified text messages may be used to provide input to the VAE in order to generate one or more images.

The generated image based noisy content may be provided in step 207. In one example, the generated image based noisy content may be provided instead of the intercepted electronic message. If, for example, the intercepted electronic message is to be displayed on the interface of the computer, the generated image based noisy content may be displayed instead of it. In another example, the generated image based noisy content may be provided in addition to the intercepted electronic message. If, for example, the intercepted electronic message is to be displayed on the interface of the computer, the generated image based noisy content may be displayed before or after (in a chat flow) displaying the intercepted electronic message. This may enable to present text of the electronic message along with any of generated ambiguous images in the next utterance.

After providing the generated image based noisy content, it may be determined if the user has identified the generated content as a noise. If the user did not identify it as a noise, the electronic communication controller 101 may stop providing further noisy content in accordance with an easy mode of operation. In another example, the electronic communication controller may persist briefly to see if the user can eventually identify noise in the conversation according to a difficult mode of operation.

Figure 3:
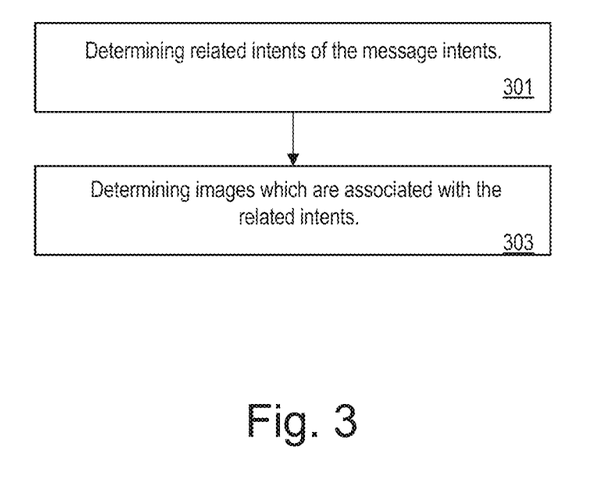
FIG. 3 is a flowchart of a method in accordance with an example of the present subject matter.

FIG. 3 is a flowchart of a method for generating images in accordance with an example of the present subject matter. For the purpose of explanation, the method described in FIG. 3 may be implemented in the system illustrated in FIG. 1A but is not limited to this implementation. The method of FIG. 3 may, for example, be performed by the electronic communication controller 101.

Related intents of the message intents may be determined in step 301. For example, the knowledge graph may be used to find a set of intents related to the message intents.

Images that are associated with the related intents and not associated with the message intents may be extracted from the knowledge base in step 303. The extracted images may, for example, be the determined image based noisy content of step 205. For example, images that are tagged with the intents present in a related set Y, but not in the image set X may be extracted. These images correspond to intents that are not present in the intercepted electronic message but are related to them. These images may introduce ambiguity.

Figure 4:
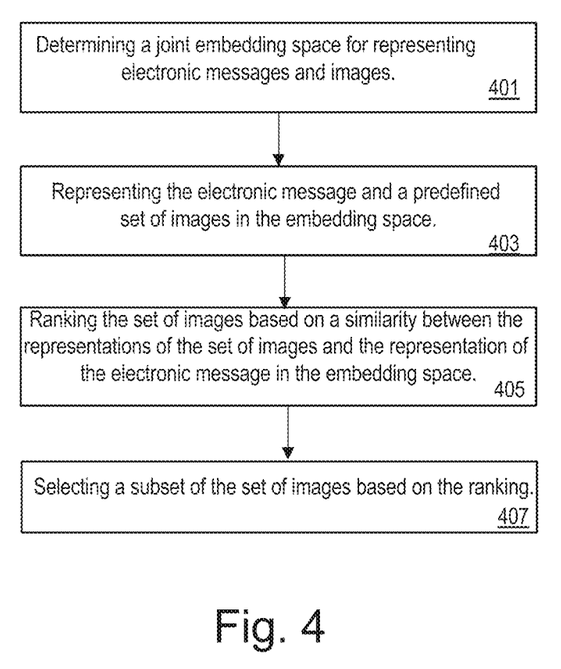
FIG. 4 is a flowchart of a method in accordance with an example of the present subject matter.

FIG. 4 is a flowchart of a method in accordance with an example of the present subject matter. For the purpose of explanation, the method described in FIG. 4 may be implemented in the system illustrated in FIG. 1A but is not limited to this implementation. The method of FIG. 4 may, for example, be performed by the electronic communication controller 101. The method of FIG. 4 provides further details of step 205. That is, the method of FIG. 4 may be used to determine the image based noisy content in step 205.

A joint embedding space may be determined in step 401. The joint embedding space may represent electronic messages and images.

The electronic message (received in step 201) and a predefined set of images may be represented in step 403 in the embedding space.

The set of images may be ranked in step 405 based on a similarity between the representations of the set of images and the representation of the electronic message in the embedding space.

A subset of the set of images may be selected in step 407 based on the ranking. The method of FIG. 4 may, for example, enable to use joint embeddings to rank all images by similarity to the text. The top-k images in this ranking are directly pertinent to the text. To introduce ambiguity, we pick the next-k images—these are somewhat relevant, but not entirely useful in the context of text t, and will lead to ambiguity. The value of k can be fine-tuned.

Figure 5:
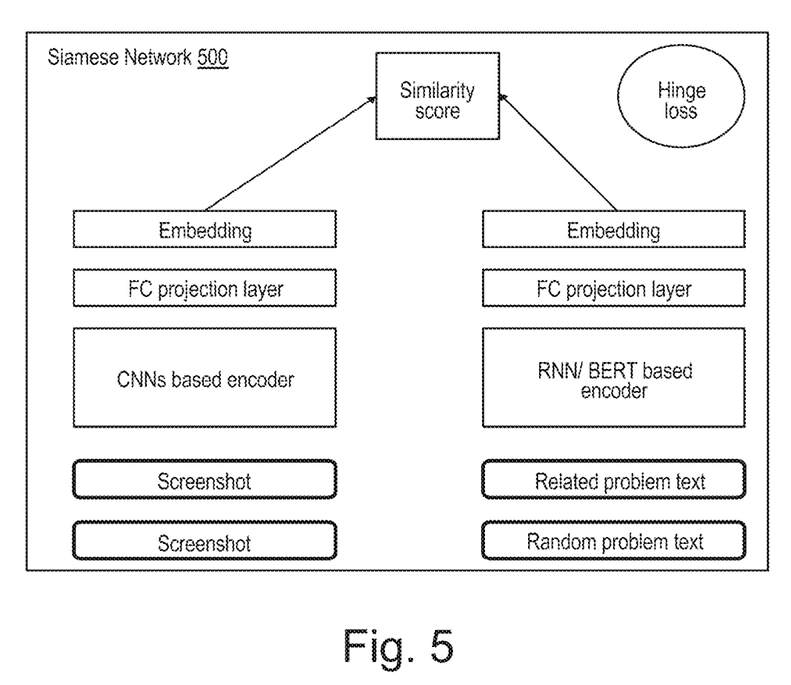
FIG. 5 is a diagram illustrating a method for linking text and image embedding spaces in accordance with the present subject matter.

FIG. 5 is a diagram illustrating a method for linking text and image embedding spaces in accordance with the present subject matter. A Siamese network 500 may be trained for identifying the image and text relationship. The image is analysed using a CNN based encoder whereas textual description is analysed using BERT based transformer. Joint embedding is learnt using hinge loss to align image and text in accordance with a Siamese neural network architecture. The Siamese network 500 is trained on a set of labelled data. The set of labelled data comprises entries. Each entry comprises a triplet consisting of an image (e.g., screenshot), related problem text or random problem text and a label. The label may be set to one if the problem text is not a random one, otherwise the label may be zero.

Figure 6:
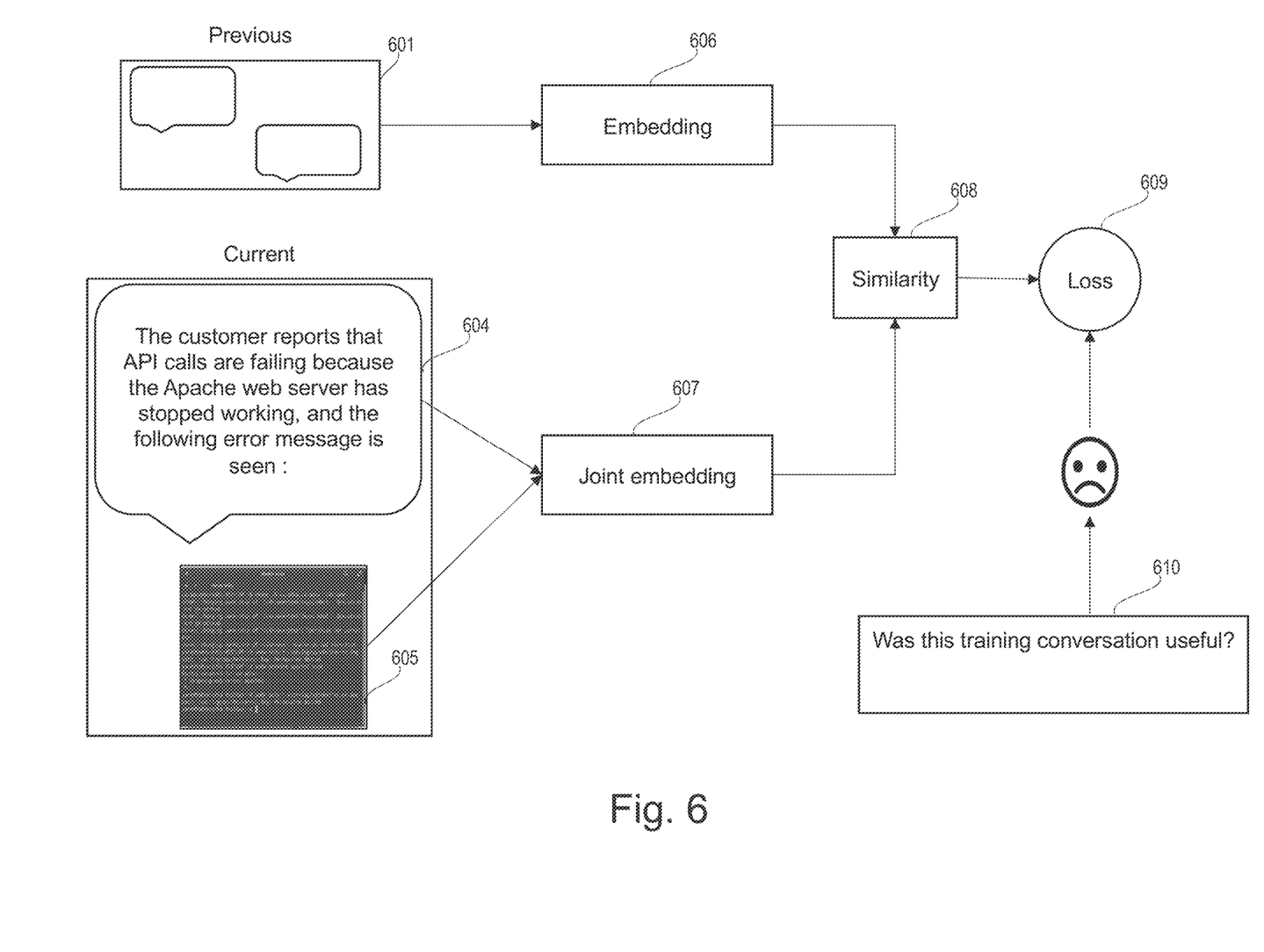
FIG. 6 is a diagram illustrating a method for testing the leaned embedding space in accordance with the present subject matter.

FIG. 6 is a diagram illustrating a method for testing the leaned embedding space in accordance with the present subject matter. One or more previous messages 601 of a conversation may be represented (606) in the embedding space. Additionally, one current message 604 and associated generated image 605 may be represented (607) in the joint embedding space. A similarity 608 between the two representations may be determined and a loss function may be evaluated (609) accordingly. Based on the determined loss it may be determined (610) whether the generated images improved the training.

Figure 7:
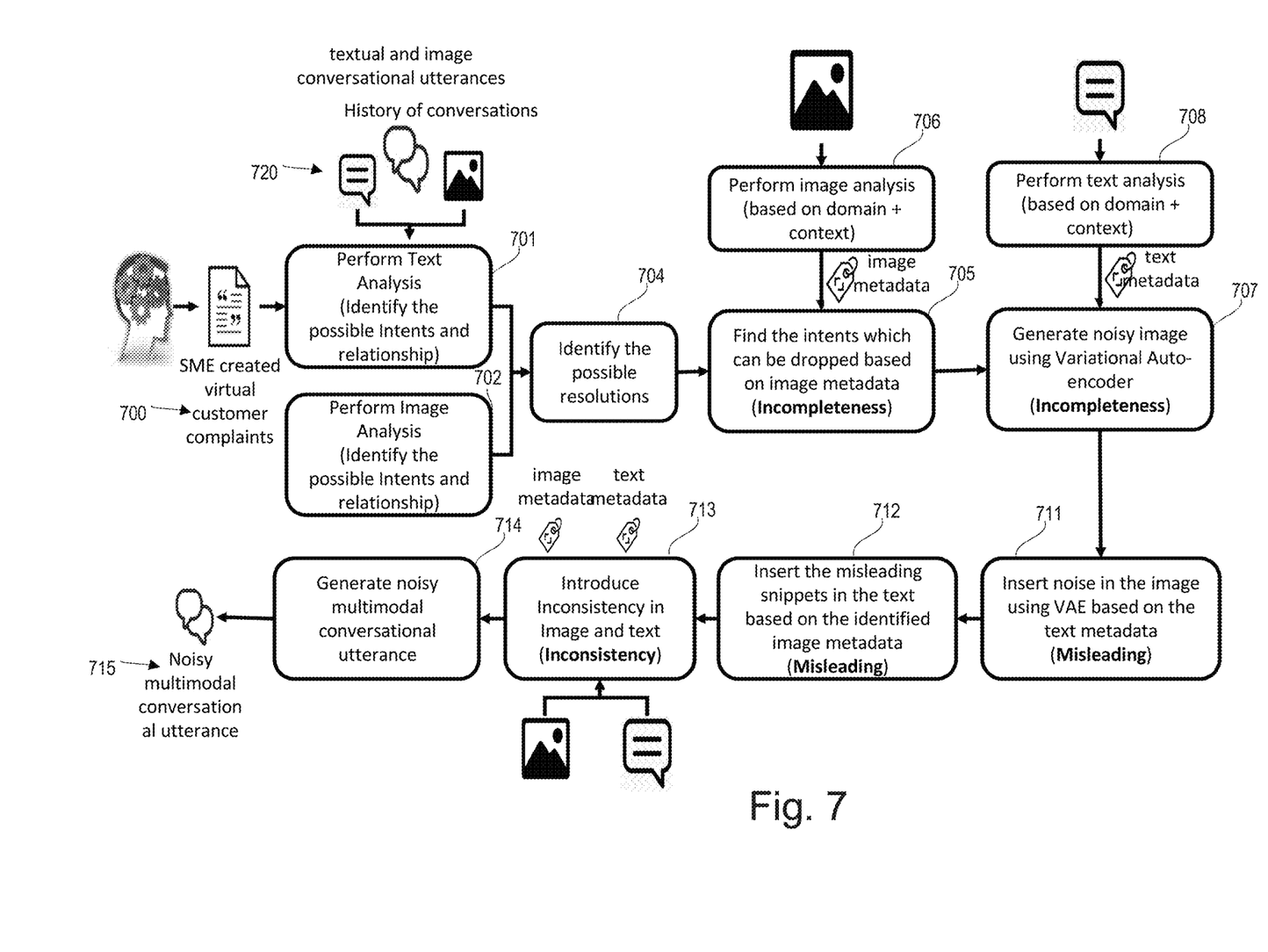
FIG. 7 is a diagram illustrating a method for generating images in accordance with the present subject matter.

FIG. 7 is a diagram illustrating a method for generating image based noisy content in accordance with the present subject matter. The method of FIG. 7 provides alternative methods for generating the image based noisy content.

An input 700 may be provided. The input 700 is initially intended to be provided to a user so that the user can answer or provide feedback on the input. The input 700 may, for example, indicate SME created virtual customer complaints. The input may, for example, comprise an electronic message $T_0$ and an image $I_0$ related to the complaints. For example, the image $I_0$ may be a screenshot of a terminal log and the electronic message $T_0$ may be a question regarding the issue listed in the log. The present method may enable to alter the input (e.g., to make the question/complaint more difficult) so that the user is better tested.

A text analysis of the electronic message $T_0$ may be performed in step 701. The text analysis may be performed in order to determine intents of the electronic message $T_0$ and relationships. The text analysis may, for example, be performed using a history 720 of textual conversational utterances. An image analysis of the image $I_0$ may be performed in step 702. The image analysis may be performed in order to determine intents of the image $I_0$ and relationships. The image analysis may, for example, be performed using the history 720 of image conversational utterances. Steps 701 and 702 may provide input intents of the input and may e.g., further provide a ranking of the input intents based on their importance. Possible resolutions of the complains may be identified in step 704 using the determined intents and the knowledge graph.

Steps 705 to 706 provide a first method to generate the image based noisy content based on the results of steps 701 to 704. Steps 705 to 709 provide a second method to generate the image based noisy content based on the results of steps 701 to 704. Step 711 provides a third method to generate the image based noisy content based on the results of steps 701 to 704. Step 712 provides a fourth method to generate the image based noisy content based on the results of steps 701 to 704. Step 713 provides a fifth method to generate the image based noisy content based on the results of steps 701 to 704.

The first method may enable to change the input in order to introduce incompleteness in the input. For that, intents of the input intents that can be dropped from the input may be identified in step 705. For that, an image analysis of the image conversational utterances may be performed in step 706 based on domain and context of the input and also based on image metadata. For example, the knowledge graph may be used to find those intents to be dropped from the input e.g., using the image conversational utterances it may be determined which intents of the input are more important than the other intents of the input. Those important intents may be the ones to be dropped e.g., if the input has 10 intents, content that represents one or two intents of the 10 intents may be dropped from the input so that the resulting/remaining input may be provided as an incomplete input to the user. There are different scenarios to make use of those identified to-be-dropped intents. In a first scenario, a new text message may be generated using the content of the image $I_0$ and the result of the image analysis e.g., the new text message may comprise the content of the image $I_0$ excluding the content that represents the to-be-dropped intents. In a second scenario, a new image may be generated using the content of the input text $T_0$ and the result of a text analysis (step 708) that is performed on the textual conversational utterances. The text analysis (708) may enable to identify intents of the input text $T_0$ which are noisy intents (e.g., unimportant intents) using the knowledge graph. The new image may contain content of the input text $T_0$ that represent those noisy intents. In a third scenario, a new text message and a new image may be generated using the content of the image $I_0$ and text $T_0$. The new text and/or new image may comprise content that represents unimportant intents only. This new image and/or new text message may be provided to the user as an incomplete input instead of the input.

The second method may enable to generate a noisy image using a VAE. For that, the input image $I_0$ as well as the identified to-be dropped intents may be provided as input to the VAE in order to generate in step 707 a noisy image. For example, the VAE will take the image $I_0$, and context information extracted by identifying the intent from image $I_0$ which needs to be dropped. This noisy image may be provided in addition to the input or provided instead of the input to the user.

The third method may enable to provide misleading information to the user. For that, the VAE may be used in step 711 to insert noise in the image of the input based on the text metadata associated with the textual conversational utterances. The VAE will take the image $I_0$ and context information extracted by identifying intent from the text message $T_0$ which needs to be added as a noise.

The fourth method may enable to provide misleading information to the user. For that, the misleading snippets may be inserted in step 712 in the text message $T_0$ of the input based on the image metadata associated with the image conversational utterances.

The fifth method may enable to introduce in step 713 inconsistency in the input by using the text and image metadata of the textual and image conversational utterances. For example, a new image and a new text message may be generated from the input image $I_0$ and the text message $T_0$.

Hence any one of the first, second, third, fourth and fifth methods may enable to provide in step 714 a noisy conversational utterance 715 to the user.

Figure 8:
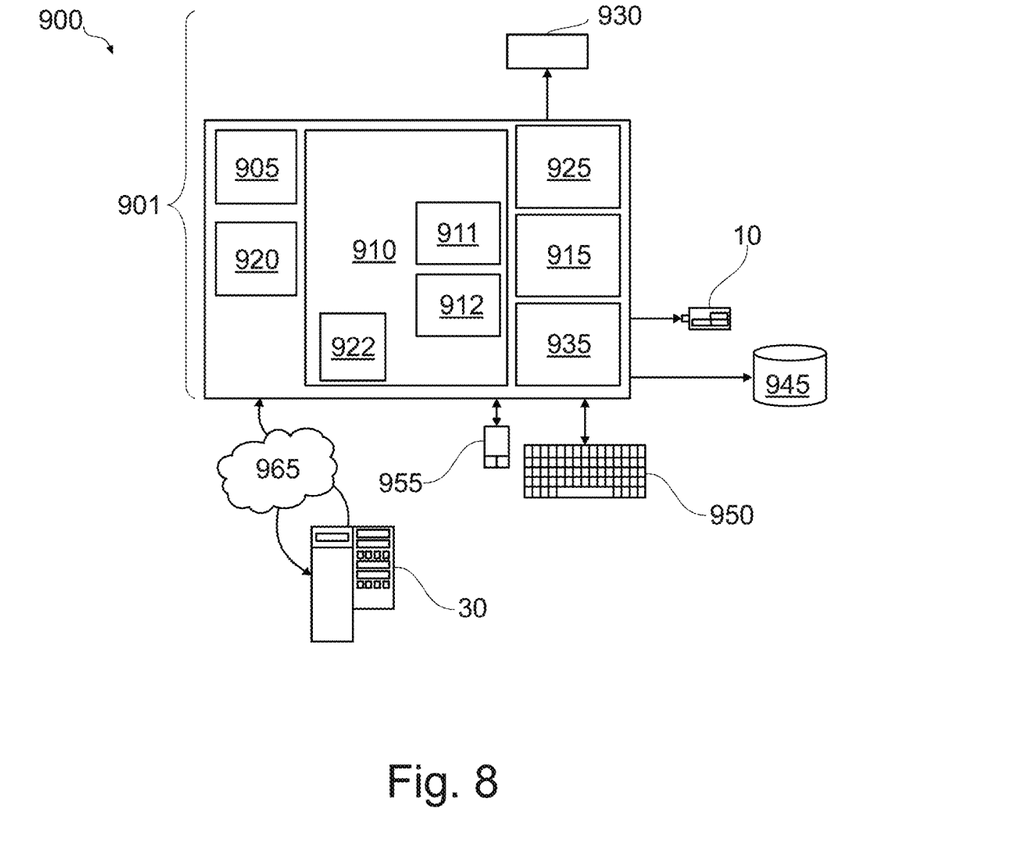
FIG. 8 represents a general computerized system suited for implementing at least part of method steps as involved in the disclosure.

FIG. 8 represents a general computerized system 900 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 912, 922 (including firmware 922), hardware (processor) 905, or a combination thereof. In exemplary embodiments, the methods described herein are implemented in software, as an executable program, and is executed by a special or general-purpose digital computer, such as a personal computer, workstation, minicomputer, or mainframe computer. The most general system 900 therefore includes a general-purpose computer 901.

In exemplary embodiments, in terms of hardware architecture, as shown in FIG. 8, the computer 901 includes a processor 905, memory (main memory) 910 coupled to a memory controller 915, and one or more input and/or output (I/O) devices (or peripherals) 10, 945 that are communicatively coupled via a local input/output controller 935. The input/output controller 935 can be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 945 may generally include any generalized cryptographic card or smart card known in the art.

The processor 905 is a hardware device for executing software, particularly that stored in memory 910. The processor 905 can be any custom made or commercially available processor, a central processing unit (CPU), an auxiliary processor among several processors associated with the computer 901, a semiconductor-based microprocessor (in the form of a microchip or chip set), or generally any device for executing software instructions.

The memory 910 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 910 can have a distributed architecture, where various components are situated remote from one another, but can be accessed by the processor 905.

The software in memory 910 may include one or more separate programs, each of which comprises an ordered listing of executable instructions for implementing logical functions, notably functions involved in embodiments of this invention. In the example of FIG. 8, software in the memory 910 includes instructions 912 e.g. instructions to manage databases such as a database management system.

The software in memory 910 shall also typically include a suitable operating system (OS) 911. The OS 911 essentially controls the execution of other computer programs, such as possibly software 912 for implementing methods as described herein.

The methods described herein may be in the form of a source program 912, executable program 912 (object code), script, or any other entity comprising a set of instructions 912 to be performed. When a source program, then the program needs to be translated via a compiler, assembler, interpreter, or the like, which may or may not be included within the memory 910, so as to operate properly in connection with the OS 911. Furthermore, the methods can be written as an object-oriented programming language, which has classes of data and methods, or a procedure programming language, which has routines, subroutines, and/or functions.

In exemplary embodiments, a conventional keyboard 950 and mouse 955 can be coupled to the input/output controller 935. Other output devices such as the I/O devices 945 may include input devices, for example but not limited to a printer, a scanner, microphone, and the like. Finally, the I/O devices 10, 945 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 945 can be any generalized cryptographic card or smart card known in the art. The system 900 can further include a display controller 925 coupled to a display 930. In exemplary embodiments, the system 900 can further include a network interface for coupling to a network 965. The network 965 can be an IP-based network for communication between the computer 901 and any external server, client and the like via a broadband connection. The network 965 transmits and receives data between the computer 901 and external systems 30, which can be involved to perform part, or all of the steps of the methods discussed herein. In exemplary embodiments, network 965 can be a managed IP network administered by a service provider. The network 965 may be implemented in a wireless fashion, e.g., using wireless protocols and technologies, such as WiFi, WiMax, etc. The network 965 can also be a packet-switched network such as a local area network, wide area network, metropolitan area network, Internet network, or other similar type of network environment. The network 965 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 901 is a PC, workstation, intelligent device or the like, the software in the memory 910 may further include a basic input output system (BIOS) 922. The BIOS is a set of essential software routines that initialize and test hardware at startup, start the OS 911, and support the transfer of data among the hardware devices. The BIOS is stored in ROM so that the BIOS can be executed when the computer 901 is activated.

When the computer 901 is in operation, the processor 905 is configured to execute software 912 stored within the memory 910, to communicate data to and from the memory 910, and to generally control operations of the computer 901 pursuant to the software. The methods described herein and the OS 911, in whole or in part, but typically the latter, are read by the processor 905, possibly buffered within the processor 905, and then executed.

When the systems and methods described herein are implemented in software 912, as is shown in FIG. 8, the methods can be stored on any computer readable medium, such as storage 920, for use by or in connection with any computer related system or method. The storage 920 may comprise a disk storage such as HDD storage.

The present subject matter may comprise the following clauses.

Clause 1. A computer implemented method for electronic messaging:

receiving an electronic message of an electronic communication system, the message being determined for a recipient;

determining message intents of the received electronic message;

generating an image based noisy content, the image based noisy content being different from a content of the received electronic message and relating to the message intents;

controlling the electronic communication system to provide the image based noisy content to the recipient instead of the received electronic message or provide the received electronic message to the recipient in addition to the image based noisy content.

Clause 2. The method of clause 1, further comprising: determining a domain of the electronic message; determining a set of one or more text messages and a set of one or more images of the determined domain; wherein generating the image based noisy content comprises any one of:

generating one or more noisy images from the set of text messages, wherein the image based noisy content is the noisy images;

extracting a noisy text from the set of images, wherein the image based noisy content is the noisy text; and generating a noisy multimodal content from the set of images and the set of text messages, wherein the image based noisy content is the noisy multimodal content.

Clause 3. The method of clause 2, wherein the set of images and set of text messages are determined such that their intents are related to a part of the message intents.

Clause 4. The method of any of the preceding clauses 1 to 3, wherein generating the image based noisy content comprises:

determining a joint embedding space for representing electronic messages and images;

representing a text message and a predefined set of images in the embedding space, the text message being the electronic message or another message having intents which are at least part of the message intents;

ranking the set of images based on a similarity between the representations of the set of images and the representation of the text message in the embedding space;

selecting a subset of one or more noisy images of the set of images based on the ranking, wherein the image based noisy content comprises the noisy images.

Clause 5. The method of clause 4, wherein the subset of noisy images are the second k-ranked images, wherein k is a value of a configurable parameter.

Clause 6. The method of clause 5, further comprising configuring the value of the parameter k in accordance with a desired noise level of the noisy content.

Clause 7. The method of any of the preceding clauses 4 to 6, wherein the joint embedding is learnt using hinge loss to align image and text in accordance with a Siamese neural network architecture.

Clause 8. The method of any of the preceding clauses 1 to 3, wherein generating the image based noisy content comprises:

determining, using a knowledge graph, related intents of the message intents, the knowledge graph comprising entities representing intents;

extracting, from a predefined set of images, a subset of images that are associated with the related intents and not associated with the message intents, wherein the image based noisy content comprises the subset of images.

Clause 9. The method of clause 8, the method further comprising: determining using the electronic message a context of a messaging session, the context of the messaging session being defined by at least a subgraph of the knowledge graph; using the subgraph for determining the related intents as intents that belong to the determined context and are associated with the message intents.

Clause 10. The method of any of the preceding clauses 1 to 3, wherein generating the image based noisy content comprises: determining, using a knowledge graph, related intents of the message intents, the knowledge graph comprising entities representing intents; generating the images using variational auto-encoder on the related entities, wherein the image based noisy content comprises the generated images.

Clause 11. The method of any of the preceding clauses 1 to 10, wherein the electronic message is intercepted from a chat application of the electronic communication system, the chat application being configured to simulate a conversation with a user during a messaging session, the receiving comprising: intercepting a message of the chat application at predefined point of times of the messaging session.

Clause 12. The method of any of the preceding clauses 1 to 11, wherein the electronic communication system is a chat server that is configured to distribute messages between chat clients.

Clause 13. The method of clause 12, wherein the electronic message is received from a first chat client in destination to a second chat client, the method further comprising: detecting sensitive information in the received electronic message, wherein the noisy content of the determined images comprises unsensitive information, wherein the determined images are provided instead of the received electronic message.

Clause 14. The method of any of the preceding clauses 1 to 13, further comprising: providing a knowledge graph representing a domain of computer related bugs fixing, the knowledge graph comprising entities representing problems and resolutions; wherein the message intents represent computer related technical problems and are associated with a set of resolutions in the knowledge graph; the determining of the images comprising determining using the knowledge graph, related intents of the message intents, the related intents being associated with resolutions different from said set of resolutions; extracting, from a predefined set of images, a subset of images that are associated with the related intents and not associated with the message intents.

Clause 15. The method of clause 14, further comprising creating the knowledge graph using communication transcripts and/or logs of previous data communications; clustering intents of the knowledge graph according to one or more graph properties of the knowledge graph, the graph property comprising any one of: a centrality index of each node of the graph and a distance of each node to other nodes of the graph.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for electronic messaging, comprising:
   receiving an electronic message of an electronic communication system, the message being determined for a recipient;
   determining message intents of the received electronic message;
   generating an image based noisy content, the image based noisy content being different from a content of the received electronic message and relating to the message intents, wherein generating the image based noisy content comprises:
      determining a joint embedding space for representing electronic messages and images, wherein the joint embedding is learnt using hinge loss to align image and text in accordance with a Siamese neural network architecture;

representing a text message and a predefined set of images in the embedding space, the text message being the electronic message or another message having intents which are at least part of the message intents;

ranking the set of images based on a similarity between the representations of the set of images and the representation of the text message in the embedding space; and selecting a subset of one or more noisy images of the set of images based on the ranking, wherein the image based noisy content comprises the noisy images; and controlling the electronic communication system to provide the image based noisy content to the recipient instead of the received electronic message or provide the received electronic message to the recipient in addition to the image based noisy content.

2. The method of claim 1, further comprising:

determining a domain of the electronic message; and determining a set of one or more text messages and a set of one or more images of the determined domain;

wherein generating the image based noisy content comprises any one of:

generating one or more noisy images from the set of text messages, wherein the image based noisy content is the noisy images;

extracting a noisy text from the set of images, wherein the image based noisy content is the noisy text; and generating a noisy multimodal content from the set of images and the set of text messages, wherein the image based noisy content is the noisy multimodal content.

3. The method of claim 2, wherein the set of images and set of text messages are determined such that their intents are related to a part of the message intents.

4. The method of claim 1, wherein the subset of noisy images are the second k-ranked images, wherein k is a value of a configurable parameter.

5. The method of claim 4, further comprising configuring the value of the parameter k in accordance with a desired noise level of the noisy content.

6. The method of claim 1, wherein generating the image based noisy content comprises:

determining, using a knowledge graph, related intents of the message intents, the knowledge graph comprising entities representing intents; and extracting, from a predefined set of images, a subset of images that are associated with the related intents and not associated with the message intents, wherein the image based noisy content comprises the subset of images.

7. The method of claim 6, the method further comprising:

determining, using the electronic message a context of a messaging session, the context of the messaging session being defined by at least a subgraph of the knowledge graph; and using the subgraph for determining the related intents as intents that belong to the determined context and are associated with the message intents.

8. The method of claim 1, wherein generating the image based noisy content comprises:

determining, using a knowledge graph, related intents of the message intents, the knowledge graph comprising entities representing intents; and generating the images using variational auto-encoder on the related entities, wherein the image based noisy content comprises the generated images.

9. The method of claim 1, wherein the electronic message is intercepted from a chat application of the electronic communication system, the chat application being configured to simulate a conversation with a user during a messaging session, the receiving comprising: intercepting a message of the chat application at predefined point of times of the messaging session.

10. The method of claim 1, wherein the electronic communication system is a chat server that is configured to distribute messages between chat clients.

11. The method of claim 10, wherein the electronic message is received from a first chat client in destination to a second chat client, the method further comprising: detecting sensitive information in the received electronic message, wherein the noisy content of the determined images comprises unsensitive information, wherein the determined images are provided instead of the received electronic message.

12. The method of claim 1, further comprising:

providing a knowledge graph representing a domain of computer related bugs fixing, the knowledge graph comprising entities representing problems and resolutions; wherein the message intents represent computer related technical problems and are associated with a set of resolutions in the knowledge graph;

the determining of the images comprising:

determining using the knowledge graph, related intents of the message intents, the related intents being associated with resolutions different from said set of resolutions; and extracting, from a predefined set of images, a subset of images that are associated with the related intents and not associated with the message intents.

13. The method of claim 12, further comprising:

creating the knowledge graph using communication transcripts and/or logs of previous data communications; and clustering intents of the knowledge graph according to one or more graph properties of the knowledge graph, the graph property comprising any one of: a centrality index of each node of the graph and a distance of each node to other nodes of the graph.

14. A computer program product comprising one or more computer-readable storage media having computer-readable program instructions embodied therewith for execution by one or more processors of one or more computers, the computer-readable program instructions comprising instructions for:

receiving, by the one or more processors, an electronic message of an electronic communication system, the message being determined for a recipient;

determining, by the one or more processors, message intents of the received electronic message;

generating an image based noisy content, the image based noisy content being different from a content of the received electronic message and relating to the message intents, wherein generating the image based noisy content comprises:

determining a joint embedding space for representing electronic messages and images, wherein the joint embedding is learnt using hinge loss to align image and text in accordance with a Siamese neural network architecture;

representing a text message and a predefined set of images in the embedding space, the text message being the electronic message or another message having intents which are at least part of the message intents;

ranking the set of images based on a similarity between the representations of the set of images and the representation of the text message in the embedding space; and selecting a subset of one or more noisy images of the set of images based on the ranking, wherein the image based noisy content comprises the noisy images; and controlling, by the one or more processors, the electronic communication system to provide the image based noisy content to the recipient instead of the received electronic message or provide the received electronic message to the recipient in addition to the image based noisy content.

15. The computer program product of claim 14, the programming instructions further comprising instructions for:

determining, by the one or more processors, a domain of the electronic message;

determining, by the one or more processors, a set of one or more text messages and a set of one or more images of the determined domain; and wherein generating the image based noisy content comprises any one of:

generating one or more noisy images from the set of text messages, wherein the image based noisy content is the noisy images;

extracting a noisy text from the set of images, wherein the image based noisy content is the noisy text; and generating a noisy multimodal content from the set of images and the set of text messages, wherein the image based noisy content is the noisy multimodal content.

16. The computer program product of claim 15, wherein the set of images and set of text messages are determined such that their intents are related to a part of the message intents.

17. A computer system comprising one or more processors and one or more tangible storage media storing programming instructions for execution by the one or more processors, the program instructions comprising instructions for:

receiving an electronic message;

determining message intents of the received electronic message;

generating an image based noisy content, the image based noisy content being different from a content of the received electronic message and relating to the message intents, wherein generating the image based noisy content comprises:

determining a joint embedding space for representing electronic messages and images, wherein the joint embedding is learnt using hinge loss to align image and text in accordance with a Siamese neural network architecture;

representing a text message and a predefined set of images in the embedding space, the text message being the electronic message or another message having intents which are at least part of the message intents;

ranking the set of images based on a similarity between the representations of the set of images and the representation of the text message in the embedding space; and selecting a subset of one or more noisy images of the set of images based on the ranking, wherein the image based noisy content comprises the noisy images; and controlling the electronic communication system to provide the image based noisy content instead of the received electronic message or provide the generated electronic message in addition to the image based noisy content.

18. The computer system of claim 17, the programming instructions further comprising instructions for:

determining, by the one or more processors, a domain of the electronic message; and determining, by the one or more processors, a set of one or more text messages and a set of one or more images of the determined domain;

wherein generating the image based noisy content comprises any one of:

generating one or more noisy images from the set of text messages, wherein the image based noisy content is the noisy images;

extracting a noisy text from the set of images, wherein the image based noisy content is the noisy text; and generating a noisy multimodal content from the set of images and the set of text messages, wherein the image based noisy content is the noisy multimodal content.

* * * * *